(12) United States Patent
Fukai

(10) Patent No.: US 8,117,889 B2
(45) Date of Patent: Feb. 21, 2012

(54) INSPECTION SYSTEM FOR PRESSURE TRANSMITTING DEVICE OF PLANT

(75) Inventor: Hisayoshi Fukai, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 941 days.

(21) Appl. No.: 12/030,620

(22) Filed: Feb. 13, 2008

(65) Prior Publication Data

US 2009/0199615 A1      Aug. 13, 2009

(51) Int. Cl.
G01L 27/00        (2006.01)
(52) U.S. Cl. ......................................................... 73/1.57
(58) Field of Classification Search ........................ None
See application file for complete search history.

(56) References Cited

U.S. PATENT DOCUMENTS

| | | | |
|---|---|---|---|
| 4,602,657 A * | 7/1986 | Anderson et al. | 137/595 |
| 7,086,272 B2 * | 8/2006 | Wu et al. | 73/1.63 |
| 2004/0227739 A1* | 11/2004 | Tani et al. | 345/173 |
| 2006/0106561 A1* | 5/2006 | Thiesen | 702/104 |
| 2007/0142727 A1* | 6/2007 | Zhang et al. | 600/486 |

FOREIGN PATENT DOCUMENTS

| | | |
|---|---|---|
| JP | 58-168933 | * 10/1983 |
| JP | 8-178788 | 7/1996 |
| JP | 10-325776 | 12/1998 |
| JP | 2001-66211 | 3/2001 |
| JP | 2002-286576 | 10/2002 |

OTHER PUBLICATIONS

Office Action issued Jul. 26, 2011, in Japanese Patent Application No. 2006-243676.

* cited by examiner

*Primary Examiner* — Robert R Raevis
(74) *Attorney, Agent, or Firm* — Oblon, Spivak, McClelland, Maier & Neustadt, L.L.P.

(57) ABSTRACT

A pressure transmitting device inspection system for a plant includes a gauge calibration terminal used for inspection of a pressure transmitting device of a plant, a determining unit which automatically downloads a gauge specification of the pressure transmitting device, monitors an applied pressure, automatically collects inspection data and automatically determines an inspection result, a remote server for gauge calibration which generates a result sheet based on the determination result, and a control unit for centrally controlling the gauge specification, the inspection result and an inspection history.

4 Claims, 3 Drawing Sheets

INSPECTION SYSTEM FOR PRESSURE TRANSMITTING DEVICE OF PLANT

BACKGROUND OF THE INVENTION

1. Field of the Invention

The present invention relates to an inspection system for a pressure transmitting device of a plant for inspecting major control process values of a plant such as pressure, liquid level and so on.

2. Related Art

Conventionally, in a site installation type pressure transmitting device for pressure system transmitting pressure, liquid level, flow rate and the like among devices of the plant, an operator connects a pressure generating source, a reference pressure gauge or a current measuring gauge to the device so as to perform inspection upon data collection of periodic inspection.

In this case, experience of the operator is a very important factor of a technique for generating the reference pressure, and sometimes, a problem may occur in inspection time, calibration accuracy of gauges, data accuracy and the like, and an error in transfer of data to a record sheet may further occur.

However, in the conventional art, there has existed no automated gauge inspection system for pressure system which does not depend upon the experience and skill of the operator.

A system which enables diagnosis of sensors for a differential pressure and a pressure transmitting device has been proposed (see, for example, Japanese Patent Application Laid-Open No. 8-247881.).

In the above-described inspection method of the pressure transmitting device, the time efficiency at the inspection and accuracy of inspection data may be affected by ability, experience and skill of an inspector. Furthermore, there has existed no system which refers to inspection history including changes in inspection data of past time and automatically determines an inspection result on site.

SUMMARY OF THE INVENTION

The present invention has been achieved in consideration of the circumstances mentioned above and an object of the present invention is to provide an inspection data collection method which does not depend on the experience and skill of an inspector and to provide an inspection system for a pressure transmitting device of a plant which centrally controls data through database so as to enable electronic data to be viewed and automatically collected.

The above and other objects can be achieved according to the present invention by providing, in a preferred aspect, a pressure transmitting device inspection system for a plant which includes a gauge calibration terminal used for inspection of a pressure transmitting device of a plant, a determining unit which automatically downloads a gauge specification of the pressure transmitting device, monitors an applied pressure, automatically collects inspection data and automatically determines an inspection result, a remote server for gauge calibration which generates a result sheet based on the determination result, and a control unit for centrally controlling the gauge specification, the inspection result and an inspection history.

In a preferred embodiment, the gauge calibration terminal used for inspection of the pressure transmitting device of the plant and a multi-channel digital multi-meter may be combined so as to inspect a plurality of the gauges all at once.

The gauge calibration terminal used for inspection of the pressure transmitting device of a plant, a digital manometer and a digital multi-meter may be combined so as to monitor an applied pressure and automatically collect a measured value when the applied pressure reaches a measuring point.

The pressure transmitting device inspection system for a plant may further includes a moving unit includes the gauge calibration terminal used for inspection of the pressure transmitting device of the plant, a level and a level adjusting mechanism.

According to the present invention, in an inspection data collection which does not depend on the experiences and skills of an inspector, data can be centrally controlled through database and viewed and automatically collected as electronic data.

The nature and further characteristic features of the present invention will be made clearer from the following descriptions made with reference to the accompanying drawings.

DESCRIPTION OF THE PREFERRED EMBODIMENTS

Hereinafter, an embodiment of the inspection system for a pressure transmitting device of a plant of the present invention will be described with reference to the accompanying drawings.

Figure 1:
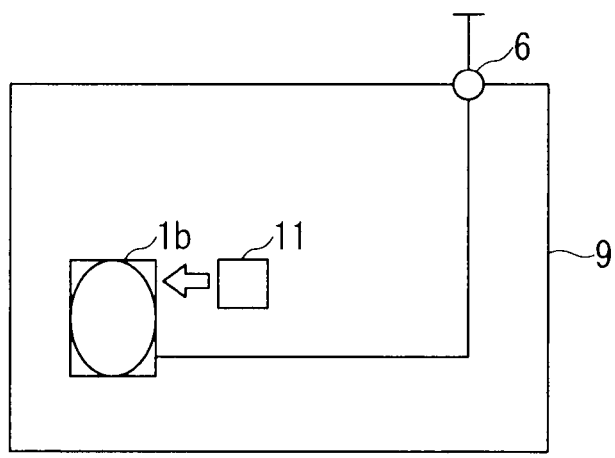
FIG. 1 is a system configuration diagram showing a workplace or an office according to a first embodiment of the present invention.
Figure 2:
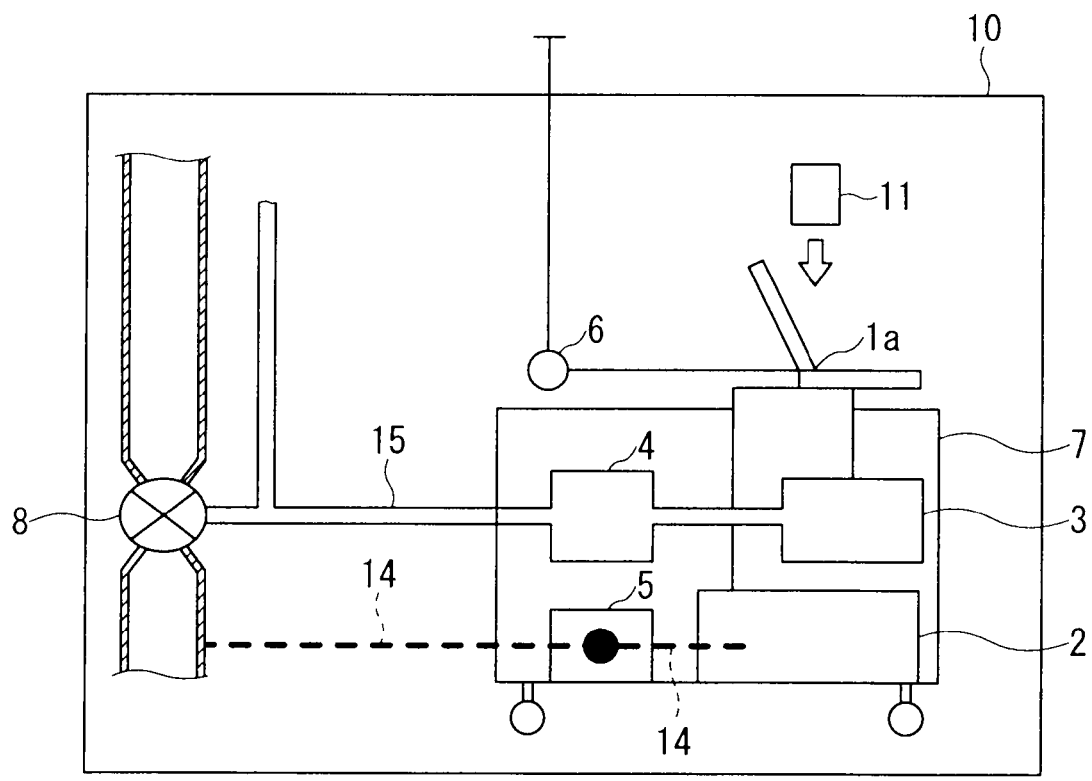
FIG. 2 is a system configuration diagram showing a plant according to the first embodiment of the present invention.

FIG. 1 and FIG. 2 are configuration diagrams showing the inspection system for the pressure transmitting device of plant according to a first embodiment of the present invention. In this embodiment, there is described a system for performing an inspection, at a time when a pressure transmitting device 8 is inspected in a plant 10, through radio communication between a gauge calibration terminal 1a (personal computer) and a gauge calibration server 1b (personal computer) using a pressure transmitting device inspection system or through updating of an inspection data by a memory card 11.

FIG. 1 shows an interior of a workplace or an office 9 in which all specifications and measurement data of measuring gauges in the plant are stored, and FIG. 2 shows a state of inspection of the pressure transmitting device 8 in the plant or a status in which the gauge calibration terminal 1a automatically measures an output value of the pressure transmitting device 8 while monitoring the pressure value.

According to this embodiment, as shown in FIG. 2, a pressure guiding pipe is connected to the pressure transmitting device 8 which is a gauge installed on site within the plant 10. Upon inspection of this pressure transmitting device 8, a pressure generating source 5 is connected to a pressure application point of the pressure transmitting device 8 using a hose 14 or the like, and the hose 14 is then connected to a digital manometer 2.

A current-voltage converter 4 is mounted to an electric signal take-out circuit 15 of the pressure transmitting device 8, and a voltage is applied to the digital multi-meter 3. The digital manometer 2 and the digital multi-meter 3 send digital values to the gauge calibration terminal 1a through an interface mounted on each measuring device.

The gauge calibration terminal 1a is connected to a transmitting/receiving unit (PHS, wireless LAN, DSL-LAN) using in-plant PHS, wireless LAN, or DSL-LAN using temporary telephone line, which relates to a conventional technology, so as to secure communication function. Further, the gauge calibration terminal 1a can exchange data with the gauge calibration servers 1b using a memory card 11 in a communication impossible state. Such a structure is constructed on a carriage 7 so as to be easily moved.

In the workplace or office 9, as shown in FIG. 1, a transmitting/receiving unit 6 is connected to the gauge calibration server 1b using the in-plant PHS line, wireless LAN, or DSL-LAN using temporary telephone line, which is the conventional technology, so as to secure communication function. Further, the gauge calibration server 1b can update data with the gauge calibration terminal 1a using the memory card 11.

In an actual measurement, each unit can attain the following function.

For example, the gauge calibration terminal 1a downloads a pressure value from the digital manometer 2 and notifies an operator of a rise in pressure, a measuring point and optimum operation speed at a descending time when the operator operates the pressure generating source 5 visually and acoustically.

When reaching a measuring point, a pressure transmitting device output signal from the digital manometer 3 is automatically downloaded. After the data is downloaded, the determination is performed on the terminal. Before a test starts, the specification of each gauge to be measured is downloaded from the gauge calibration server 1b using the communication function. Thus, it is preferable to automatically set a measuring range. Further, the gauge calibration terminal 1a has a monitoring function by which a zero point of the digital manometer 2 is confirmed when measurement starts.

The gauge calibration server 1b manages the gauge specification such as Tag No., type, measuring range, temperature correction value, density correction value, specific gravity, setting values, accuracy tolerance, installation place of each gauge used in the plant 10 in the form of database. The gauge calibration server 1b has a function of generating a result sheet of the inspected pressure transmitting device 8 from data such as inspection history, inspection data and used gauge information.

The digital manometer 2 is a gauge capable of indicating a pressure signal in digital value, and in the structure of this embodiment, the digital manometer 2 is equipped with an interface card and sends a pressure measurement value to the gauge calibration terminal 1a through the transmitting/receiving unit 6 as radio signal.

The digital multi-meter 3 receives and indicates the output signal of the pressure transmitting device 8 through the current-voltage converter 4 as digital value. The digital multi-meter 3 is equipped with an interface card and sends a pressure transmitting device output signal value to the gauge calibration terminal 1a. In the meantime, as the gauges, it is preferable to use high-speed multi-channel type gauges.

The current-voltage converter 4 converts a current output signal (4 mA-20 mA) of the pressure transmitting device 8 to a voltage and applies this voltage to the digital multi-meter 3.

The pressure generating source 5 includes a manual pump, a nitrogen tank, an adjustment valve unit and the like, and generation of pressure at the time of inspection is carried out through operation of the as conventionally carried out.

The transmitting/receiving unit 6 includes a communication interface which employs the in-plant PHS line, wireless LAN or DSL-LAN using temporary telephone line as is conventionally performed.

The carrier 7 carries all devices for use on the site described above so as to save labor for traveling on site, and depending on the situation of the site, a tray carrier may be used. In any case, it is preferred that the carrier has a level and a level adjusting mechanism (adjusting legs) so as to secure a measurement condition without any fault. In this embodiment, the pressure transmitting device 8 is a gauge for detecting major control process values of the plant, such as pressure, liquid level, flow rate or like.

As shown in FIG. 1, the workplace or office 9 is used as an installation place for the gauge calibration server 1b. The gauge calibration server 1b copes with simultaneous operations of a plurality of the gauge calibration terminals 1a as a server. Since the data can be relayed through LAN configuration, a remote control may be realized.

If communication between the gauge calibration terminal 1a and the gauge calibration server 1b is disabled depending on the inspection condition of pressure transmitting device on site of the plant 10, the data is updated between the respective devices using the memory card 11.

According to the first embodiment of the present invention, the necessity of carrying a paper sheet on which individual specifications (range, temperature correction, head correction, specific gravity of a measured object) are printed, when inspecting the pressure transmitting device 8 is eliminated, and an error upon transfer of data and a mistake in data entry are eliminated thereby establishing maintenance support system capable of saving labor.

Figure 3:
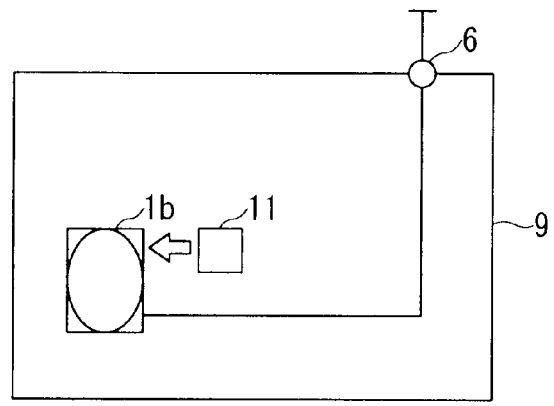
FIG. 3 is a system configuration diagram showing a workplace or office according to a second embodiment of the present invention.
Figure 4:
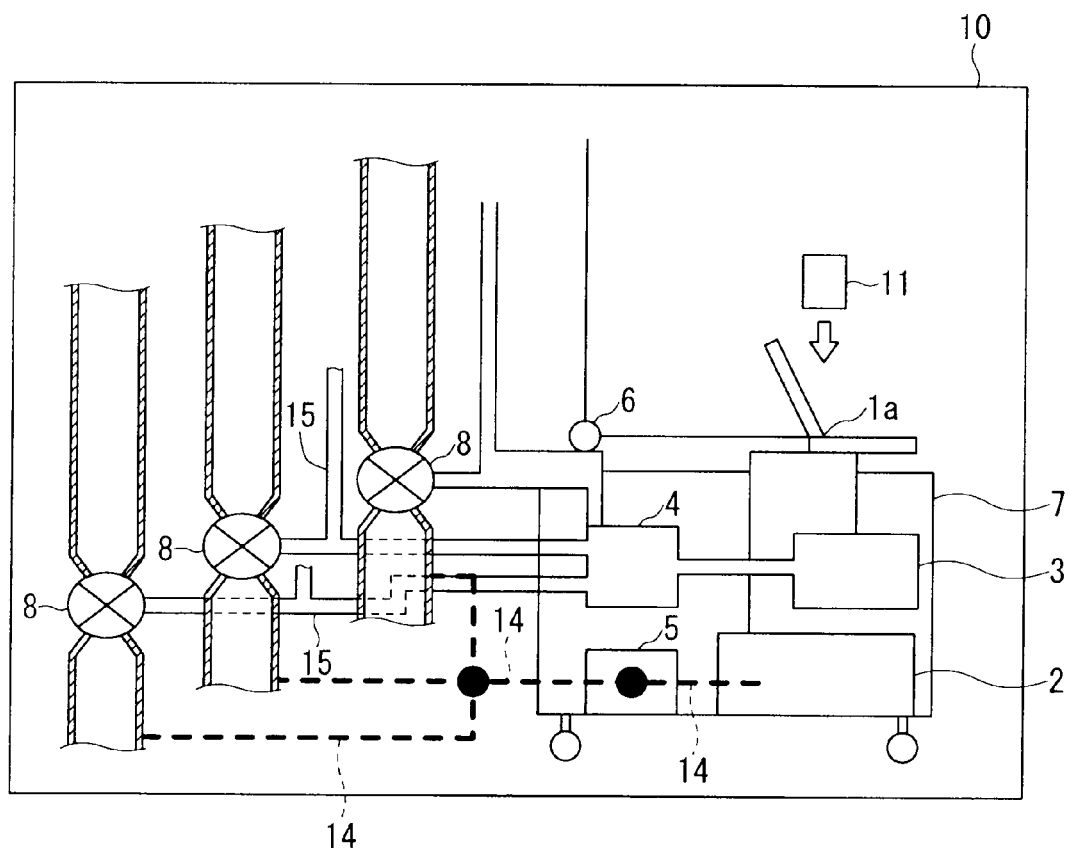
FIG. 4 is a system configuration diagram showing a plant according to the second embodiment of the present invention.

FIG. 3 and FIG. 4 show a second embodiment of the present invention. Particularly, FIG. 4 shows a state in which when inspecting the pressure transmitting device 8 installed on site in the plant 10, the inspection is carried out all at once by applying pressure to the pressure transmitting devices 8 in the same range at the same time. Further, in this embodiment, like reference numerals shown in FIG. 1 and FIG. 2 representing the first embodiment are added to the corresponding components or elements in FIG. 3 and FIG. 4 and duplicated description thereof is eliminated herein.

FIG. 3 and FIG. 4 show a configuration in which when inspecting the pressure transmitting device 8 in the plant 10 using the pressure transmitting device inspection system, the inspection data is updated through the wireless communication between the gauge calibration terminal 1a and the gauge calibration server 1b or through the memory card 11.

FIG. 3 shows the workplace or office 9 in which all specifications and measuring data of gauges in the plant are stored. FIG. 4 shows a state in which the output values of the plural pressure transmitting devices 8 are automatically measured at the same time while the gauge calibration terminal 1a monitoring the applied pressure value when the pressure transmitting device 8 in the plant is inspected.

According to the second embodiment of the present invention, in the simultaneous inspection of the pressure transmitting devices 8, it is not necessary to carry a paper sheet on which individual specifications (range, temperature correction, head correction, specific gravity of a measured object)

are printed, an error upon transfer of data and mistake in data entry and the like are eliminated, and the plural pressure transmitting devices 8 can be automatically measured. Consequently, it becomes possible to provide a plant pressure transmitting device inspection system capable of largely saving labor.

Figure 5:
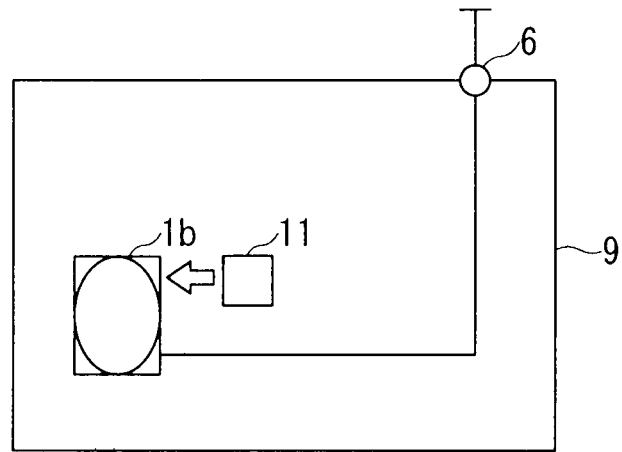
FIG. 5 is a system configuration diagram showing a workplace or office according to a third embodiment of the present invention.
Figure 6:
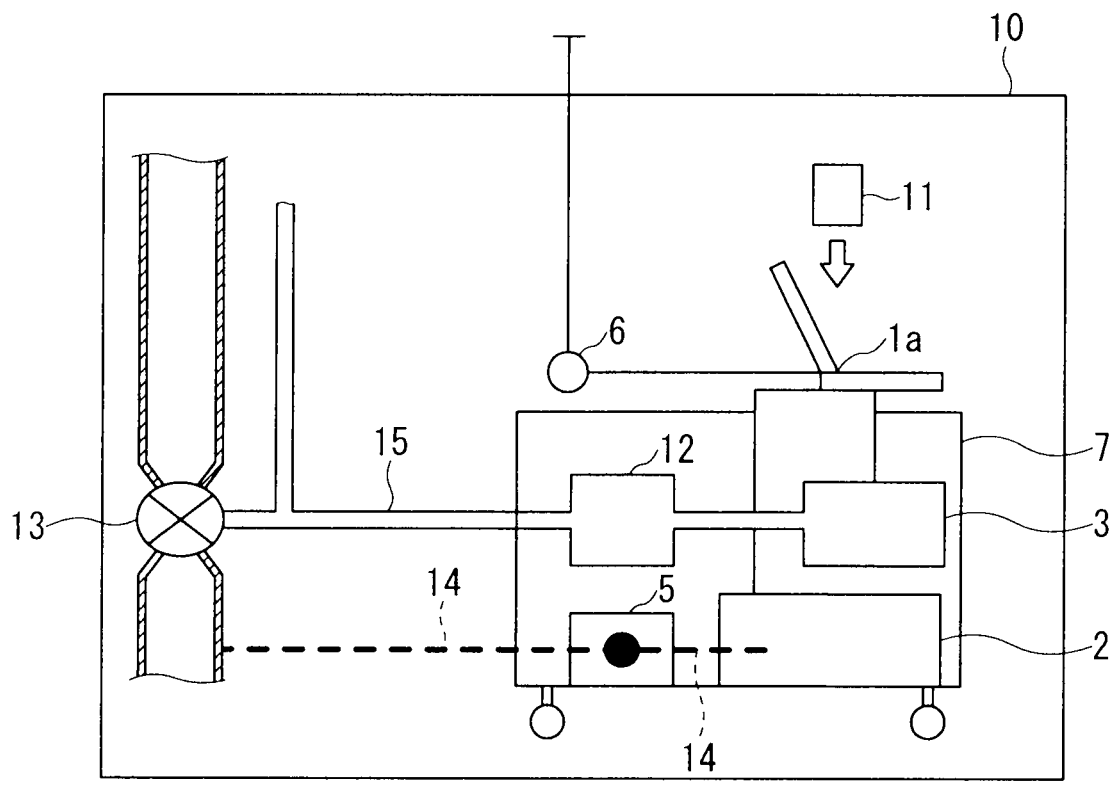
FIG. 6 is a system configuration diagram showing a plant according to the third embodiment of the present invention.

FIG. 5 and FIG. 6 show a method of inspecting the pressure transmitting device 8 in the plant 10 according to a third embodiment of the present invention using the pressure transmitting device inspection system by updating the inspection data through the wireless communication between the gauge calibration terminal 1a and the gauge calibration server 1b or through the memory card 11.

FIG. 5 is a configuration diagram showing the interior of the workplace or office 9 in which all specifications and measuring data of gauges in the plant are stored, and FIG. 6 is a configuration diagram explaining automatic measurement of a contact point output of the pressure switch 13 while the gauge calibration terminal 1a monitoring the applied pressure value when the pressure switch 13 in the plant 13 is inspected.

FIG. 6 represents a condition of inspection with the pressure switch 13 as carrying out of this embodiment. Simultaneous inspection on the plural pressure transmitting devices 8 by applying pressure at the same time is enabled as like as in FIG. 3 and FIG. 4. A contact point-voltage converter 12 converts a contact point output signal of the pressure switch 13 to a voltage and is connected to the digital multi-meter 3. The pressure switch 13 is a gauge for detecting major control process values of the plant such as pressure, liquid level and so on.

According to the third embodiment of the present invention, it is not necessary to carry a paper sheet, on which individual specifications (range, temperature correction, head correction, specific gravity of a measured object) are printed, when inspecting the pressure switch 13, and an error upon transfer of data and mistake in data entry and the like are eliminated thereby establishing the plant pressure transmitting device inspection system capable of saving labor.

According to the present invention, as described above, there is provided a plant pressure transmitting device inspection system. In this system, the gauge specifications are automatically downloaded, applied pressure is monitored, inspection data is automatically collected, and inspection results are automatically determined using the gauge calibration terminal 1a (personal computer) at the time of inspecting the pressure transmitting device 8 which is a site installation type gauge for measuring pressure, liquid level, or flow rate among devices of the plant 10. Further, a result sheet is generated using a remote gauge calibration server 1b (personal computer) so as to centrally control the gauge specifications, inspection result and inspection history.

Automatic download of the specifications of the gauges, monitoring of applied pressure, automatic collection of inspection data and automatic determination of inspection results are carried out using the gauge calibration terminal 1a at the time of inspecting the pressure switch 13 which is a site installation type gauge for measuring pressure or liquid level among devices of the plant 10. That is, the result sheet is generated with the remote personal computer server so as to centrally control the specification of the gauge, inspection result and inspection history.

Furthermore, according to the present invention, there is provided a plant pressure transmitting device inspection system for inspecting a plurality of gauges all at once by combining the gauge calibration terminal 1a and the multi-channel digital multi-meter 3 at the time of inspecting the site installation type gauge for pressure, liquid level, or flow rate among devices of the plant 10.

Still furthermore, there is provided a plant pressure transmitting device inspection system having a function of monitoring an applied pressure and automatically collecting a measured value when a measuring (calibration) point is reached by combining the gauge calibration terminal 1a, the digital manometer 2 and the digital multi-meter 3 at the time of inspecting the site installation type gauge for pressure, liquid level or flow rate among devices of the plant 10.

Still furthermore, there is provided a plant pressure transmitting device inspection system in which the gauge calibration terminal 1a, the digital manometer 2 and the digital multi-meter 3 are combined. In the system, at the time of inspecting the site installation type gauge for measuring pressure, liquid level, or flow rate among devices of the plant 10, an applied pressure is monitored, and until a measuring (calibration) point reaches, the applied pressure in terms of pressure ascension/descension speed is visually and acoustically indicated to the operation. When the operation does not coincide with a measurement condition, the system activates as alarm to prevent erroneous operation.

A set of inspection devices for use on site when the site installation type gauges among devices of the plant 10 is inspected is mounted on the carrier 7 having the level and level adjusting mechanism (adjusting legs) so that no fault occurs in measurement. Thus, the inspection devices can be moved easily on site.

According to the embodiment of the present invention, automatic downloading of the gauge specifications, automatic collection of inspection data and automatic determination of inspection result are carried out about all gauges of the plant 10 using the gauge calibration terminal 1a. Consequently, there is provided a plant pressure transmitting device inspection system which generates a result sheet and stores the gauge specification, the inspection result and the inspection history by the remote gauge calibration server 1b.

Further, for communication of gauge specification, inspection history and inspection collection data between the gauge calibration terminal 1a used on site for inspection of devices of the plant 10 and the remote gauge calibration server 1b, existing PHS system and wired or wireless LAN system can be used, and communication with wired or wireless LAN from the DSL model using temporary telephone line upon inspection of the plant 10 can be enabled.

The memory card 11 can be used for updating of the gauge specification, inspection history and inspection collection data in the gauge calibration terminal 1a for use on site for inspecting devices constituting the plant 10 and the remote gauge calibration server 1b.

What is claimed is:

1. A pressure transmitting device inspection system for a plant comprising:
   a gauge calibration terminal used for inspection of a pressure transmitting device of a plant,
   the gauge calibration terminal being configured to automatically download a gauge specification of the pressure transmitting device, monitor an applied pressure, automatically collect inspection data and automatically determine an inspection result; and
   a remote calibration server for gauge calibration configured to generate a result sheet based on the determination result, and to centrally control the gauge specification, and to store the inspection result and an inspection history.

2. The pressure transmitting device inspection system for a plant according to claim 1, wherein the gauge calibration terminal used for inspection of the pressure transmitting device of the plant and a multi-channel digital multi-meter are combined so as to inspect a plurality of pressure transmitting devices all at once.

3. The pressure transmitting device inspection system for a plant according to claim 1, wherein the gauge calibration terminal used for inspection of the pressure transmitting device of a plant, a digital manometer and a digital multi-meter are combined so as to monitor an applied pressure and automatically collect a measured value when the applied pressure reaches a measuring point.

4. The pressure transmitting device inspection system for a plant according to claim 1, further comprising a moving unit that includes the gauge calibration terminal used for inspection of the pressure transmitting device of the plant, a level and a level adjusting mechanism.

* * * * *